United States Patent
Bumbu

(10) Patent No.: US 9,441,071 B2
(45) Date of Patent: Sep. 13, 2016

(54) FAST EPOXY RESIN FOR REPAIRING GLAZED SURFACES BY MANUAL LAMINATION

(71) Applicant: InovaChem Engineering AG, Wetzikon (ZH) (CH)

(72) Inventor: Gina Gabriela Bumbu, Zurich (CH)

(73) Assignee: Inovachem Engineering AG, Wetzikon (CH)

( * ) Notice: Subject to any disclaimer, the term of this patent is extended or adjusted under 35 U.S.C. 154(b) by 0 days.

(21) Appl. No.: 14/785,871

(22) PCT Filed: Apr. 24, 2014

(86) PCT No.: PCT/EP2014/058374
§ 371 (c)(1),
(2) Date: Oct. 21, 2015

(87) PCT Pub. No.: WO2014/174029
PCT Pub. Date: Oct. 30, 2014

(65) Prior Publication Data
US 2016/0075818 A1    Mar. 17, 2016

(30) Foreign Application Priority Data
Apr. 26, 2013   (EP) .................................... 13165514

(51) Int. Cl.
| | |
|---|---|
| *C08G 59/66* | (2006.01) |
| *C08G 59/22* | (2006.01) |
| *C08G 59/56* | (2006.01) |
| *C08K 5/00* | (2006.01) |
| *C08L 63/00* | (2006.01) |
| *B65D 81/32* | (2006.01) |
| *C08G 59/24* | (2006.01) |
| *C09D 163/00* | (2006.01) |
| *D06M 13/11* | (2006.01) |
| *D06M 13/325* | (2006.01) |
| *D06M 13/335* | (2006.01) |
| *D06M 13/503* | (2006.01) |
| *D06M 15/55* | (2006.01) |
| *D06M 15/63* | (2006.01) |
| *F16L 55/1645* | (2006.01) |
| *F16L 55/18* | (2006.01) |

(52) U.S. Cl.
CPC ............... *C08G 59/66* (2013.01); *B65D 81/32* (2013.01); *C08G 59/22* (2013.01); *C08G 59/245* (2013.01); *C08G 59/56* (2013.01); *C08K 5/0025* (2013.01); *C08L 63/00* (2013.01); *C09D 163/00* (2013.01); *D06M 13/11* (2013.01); *D06M 13/3255* (2013.01); *D06M 13/335* (2013.01); *D06M 13/503* (2013.01); *D06M 15/55* (2013.01); *D06M 15/63* (2013.01); *F16L 55/1645* (2013.01); *F16L 55/18* (2013.01); *D10B 2101/06* (2013.01); *D10B 2331/021* (2013.01); *D10B 2505/06* (2013.01)

(58) Field of Classification Search
CPC ...... C08G 59/66; C08G 59/22; C08G 59/56; C08G 59/245; C08K 5/0025; C08L 63/00; B65D 81/32; C09D 163/00; D06M 13/11; D06M 13/3255; D06M 13/335; D06M 13/503; D06M 15/55; D06M 15/63; D10B 2101/06; D10B 2331/021; D10B 2505/06; F16L 55/1645; F16L 55/18
See application file for complete search history.

(56) References Cited

U.S. PATENT DOCUMENTS

| | | | |
|---|---|---|---|
| 5,143,999 | A | 9/1992 | Setiabudi et al. |
| 6,170,531 | B1 | 1/2001 | Jung et al. |
| 2010/0129663 | A1 | 5/2010 | Salnikov |

FOREIGN PATENT DOCUMENTS

| | | |
|---|---|---|
| EP | 2 123 689 A1 | 11/2009 |
| WO | WO 2010/120617 | 10/2010 |

OTHER PUBLICATIONS

English machine translation of KR20050033184.*
Abstract of Korean Patent—KR20050033184, Apr. 12, 2005, 1 page.
Abstract of WO 2011/036266 A1 equivalent of DE 20 2010 010 575, Mar. 31, 2011, 1 page.
Article—Dai et al., "Phenalkamine Multipurpose Epoxy Resin Curing Agents," *SPI-ERF Conference*, Sep. 1994, 3 pages.
International Search Report for PCT/EP2014/058374 dated Jul. 15, 2014, 3 pages.

* cited by examiner

*Primary Examiner* — Michael C Miggins
(74) *Attorney, Agent, or Firm* — Dority & Manning, P.A.

(57) ABSTRACT

The present invention relates to a fast curing two component epoxy resin which has excellent adhesion properties to glazed surfaces and a short tack free time at ambient and low temperature conditions. The invention also relates a process for the rehabilitation of glazed surfaces, especially glazed ceramic surfaces or glazed cement surfaces. Furthermore the present invention describes a cartridge for the transportation and risk-free mixing of the described epoxy resin on site.

12 Claims, No Drawings

FAST EPOXY RESIN FOR REPAIRING GLAZED SURFACES BY MANUAL LAMINATION

CROSS REFERENCE TO RELATED APPLICATIONS

This application is the national stage entry of International Patent Application No. PCT/EP2014/058374 having a filing date of Apr. 24, 2014, which claims priority to and the benefit of European Patent Application No. 13165514.4 filed in the European Patent Office on Apr. 26, 2013, the entire contents of which are incorporated herein by reference.

The present invention relates to a fast curing two component epoxy resin which has excellent adhesion properties to glazed surfaces and a short tack free time. The invention also relates to a process for the rehabilitation of glazed surfaces, especially glazed ceramic surfaces or glazed cement surfaces. Furthermore the present invention describes a cartridge for the transportation and risk-free mixing of the described epoxy resin on site.

BACKGROUND OF THE INVENTION

Water and gas as well as sewage drainage are supplied to domestic and commercial properties by way of underground pipes. Due to the ageing of the material of the pipes or other disturbances the pipes often suffer damages that may result in leaks. To prevent environmental pollution a fast and easy method of repair is required. Rehabilitation by removal and exchange of the defective partial section is an extensive and cost intensive method. The excavation and work to free the pipes is often difficult to perform and requires particular measures to protect against dirt. Additionally, resulting construction sites represent a potential source of danger and an inconvenience to the surroundings. An alternative method of rehabilitation is the trenchless technology which conducts the renovation of the pipe from the inside by applying a sealing to the inner surface of the pipe, usually glass fabrics which are attached to the surface employing an epoxy resin. However this method of rehabilitation puts a high demand on the materials involved as they are required to possess special properties such as good adhesion to the surface, a fast curing time and a high resistance to abrasion, pressure, water and the like.

PRIOR ART

U.S. Pat. No. 5,143,999 describes hardenable mixtures of materials consisting of epoxy resins, special polyoxyalkylene-dithiols and polyamines having at least two primary amino groups and the crosslinked products obtained from such mixtures. The mixtures can be used for the production of sealing composites and injection composites.

U.S. Pat. No. 6,170,531 relates to a flexible tubular lining material which comprises a seamless plush textile tube and a plastic layer arranged coaxially and freely around it as well as a method for the production of pipe lining which comprises impregnation of the lining material with a curable resin composition, the introduction of the impregnated material into an inversion tube, the subsequent pressing of this arrangement into the pipe section to be lined and the curing of the resin under maintenance of applied pressure in the inversion tube.

WO 2010/120617 A2 presents a method for forming a coating on the surface of a pipeline with two-parts coating compositions wherein one part comprises a polyisocyanate and the second part comprises an aspartic acid ester. Optionally the composition may include an aromatic amine which is solid at 25° C.

DE 20 2010 010 575 U1 describes a lining material for the inner surface of pipes, especially sewer and wastewater pipes, that is made up of a tube made of a textile material that contains a mixture of glass fibers and synthetic fibers. One side of this tube is attached to a foam material while the other side is coated with a layer of a resin, for example polyurethane, polyvinylchloride, polyacrylate or polyolefine.

Most of the resins employed for the rehabilitation of pipes show poor adhesion to the surface of the pipe which is even more hindered by the fact that most of the pipes commonly used in sewer system possess an inner surface made of glazed ceramics to prevent the accumulation of dirt and other flow disturbances. Although commonly used acrylate or polyurethane resins show relatively short curing time, the acrylate resins suffer from a high shrinkage during curing while the polyurethane resins are rather moisture sensitive and tend to foam in the presence of moisture. Furthermore, in most cases the inner wall of the damaged pipe has to be extensively cleaned, dried and usually roughed prior to lining to achieve a satisfactory performance of the resin.

As a consequence, it is an object of the present invention to provide a fast curing resin that also possesses good adhesion properties to glazed surfaces. A further object of the invention is the provision of a system which can be used for the rehabilitation of pipes, i.e. which demonstrates an excellent performance under moisture conditions in terms of low shrinkage and adhesion to glazed surfaces.

DESCRIPTION

It has surprisingly been found that a combination of a resin of diglycidyl ether of Bisphenol A which carries electron-withdrawing substituents at the aromatic moiety, an amine and a mercaptan leads to a cured composition which not only shows excellent adhesion properties but also possess a very short curing time at low temperatures. The curing time of the composition according to the invention can be reduced by half compared to commonly used epoxy resins consequently resulting in shorter tack free times. Furthermore the system according to the present invention shows no or only very small shrinkage after curing and is suitable to be used under moist conditions such as for the rehabilitation of pipes.

Accordingly, the present invention discloses a system for the rehabilitation of glazed surfaces. Therefore an embodiment of the present invention is a system comprising a composition A and separately a composition B wherein Composition A comprises
  a) a resin of a diglycidyl ether of Bisphenol A which carries at least one electron-withdrawing substituent at the aromatic moiety; and wherein Composition B comprises
  a) a phenalkamine and
  b) a mercaptan.

The system of the invention is a kit wherein composition A and composition B are separated from each other. Upon mixing of composition A with composition B curing of the resin mixture starts.

The resin of diglycidyl ether of Bisphenol A present in composition A carries one or more electron-withdrawing substituents at the aromatic moiety. Preferably the electron-withdrawing substituents are chosen from but are not limited to the group consisting of —$NO_2$, —CN, —F, —Cl, —Br, —$NR^1R^2R^{3+}$, —$COR^4$, —$SO_2R^5$, —$SO_2OR^6$ and —NO, wherein $R^1$, $R^2$ and $R^3$ are independently selected from H and —$C_{1-10}$-alkyl, preferably —$C_{1-4}$-alkyl, especially preferred methyl or ethyl. Especially preferred is an embodiment wherein $R^1$, $R^2$ and $R^3$ are equal and selected from H, methyl and ethyl.

$R^4$ is selected from the group consisting of H, —$C_{1-10}$-alkyl, —$OR^7$, —$NR^8R^9$, wherein $R^7$ is selected from H and —$C_{1-10}$-alkyl, preferably —$C_{1-4}$-alkyl, especially preferred methyl or ethyl; and $R^8$ and $R^9$ are independently selected from H and —$C_{1-10}$-alkyl, preferably —$C_{1-4}$-alkyl, especially preferred methyl or ethyl; and $R^5$ is selected from H and —$C_{1-10}$-alkyl, preferably —$C_{1-4}$-alkyl, especially preferred methyl or ethyl; and $R^6$ is selected from H and —$C_{1-10}$-alkyl, preferably —$C_{1-4}$-alkyl, especially preferred methyl or ethyl.

Electron-withdrawing group according to the present invention refers to an atom or a group of atoms that draws electron density from the aromatic moiety towards itself, usually by resonance or inductive effects.

Preferably the electron-withdrawing group possesses inductive properties. Therefore, in a preferred embodiment of the present invention the electron-withdrawing group is selected from the group consisting of —$NR^1R^2R^{3+}$—, —$NO_2$, —CN, —$COR^4$, —F, —Cl, —Br and $SO_2R^5$, wherein $R^1$, $R^2$ and $R^3$ are independently selected from H and —$C_{1-10}$-alkyl, preferably —$C_{1-4}$-alkyl, especially preferred methyl or ethyl or H;

$R^4$ is selected from the group consisting of H, —$C_{1-10}$-alkyl and —$OR^6$ wherein $R^6$ is selected from H and —$C_{1-10}$-alkyl, preferably —$C_{1-4}$-alkyl, especially preferred methyl or ethyl; and $R^5$ is selected from H and —$C_{1-10}$-alkyl, preferably —$C_{1-4}$-alkyl, especially preferred methyl or ethyl.

Alternatively the electron-withdrawing group preferably possesses resonance effective properties. Therefore, in an alternatively preferred embodiment of the present invention the electron-withdrawing group is selected from the group consisting of —$NO_2$, —CN, —$COR^1$, —$SO_2R^2$, —$SO_2OR^3$ and —NO, wherein $R^1$ is selected from the group consisting of H, —$C_{1-10}$-alkyl, —$OR^4$, —$NR^5R^6$, wherein $R^4$ is selected from H and —$C_{1-10}$-alkyl, preferably —$C_{1-4}$-alkyl, especially preferred methyl or ethyl; and $R^5$ and $R^6$ are independently selected from H and —$C_{1-10}$-alkyl, preferably —$C_{1-4}$-alkyl, especially preferred methyl or ethyl; and $R^2$ is selected from H and —$C_{1-10}$-alkyl, preferably —$C_{1-4}$-alkyl, especially preferred methyl or ethyl; and $R^3$ is selected from H and —$C_{1-10}$-alkyl, preferably —$C_{1-4}$-alkyl, especially preferred methyl or ethyl.

Especially preferred is an embodiment of the present invention wherein the electron-withdrawing group contains nitrogen, preferably selected from the group consisting of —$NO_2$, —$NH_3^+$, —$N(CH_3)_3^+$ and —$NEt_3^+$ with Et=ethyl.

Preferably the electron-withdrawing group is in the ortho position to the ether group at the aromatic moiety of the diglycidyl ether of Bisphenol A.

The resin of a diglycidyl ether of Bisphenol A carrying at least one electron-withdrawing substituent at the aromatic moiety (hereinafter: resin a)) usually is a mixture of the monomer and oligomers. Resin a) is to be understood as a resin of a diglycidyl ether of Bisphenol A having at least an additionally electron-withdrawing substituent at one or more of the aromatic moieties.

Preferably, the electron-withdrawing substituent is not a substituent having an oxygen atom directly attached to the aromatic moiety.

In a preferred embodiment the resin according to the invention is a liquid at 25° C. Preferably the resin according to the invention has an Epoxy Equivalent Weight (EEW) of 97.5 to 330 g/eq, preferably 155 to 265 g/eq and especially preferred 195 to 220 g/eq.

Good adhesion properties of the resin are desirable for a quick and long-lasting rehabilitation of glazed surfaces, especially in moist environments. It has been found that said properties can even be improved by using a bifunctional organosilane.

Thus, according to a preferred embodiment of the invention composition A of the system further comprises a bifunctional organosilane.

Any bifunctional organosilane that promotes the adhesion properties of the resin to glazed surfaces would be suitable. However, in the case of the present invention organosilanes belonging to the group of trimethoxysilanes are preferred; most preferred being the bifunctional organosilane 3-glycidyloxypropyltrimethoxysilane.

An embodiment of the present invention is preferred in which the amount of bifunctional organosilane present in composition A ranges from 0.5 weight-% to 6.0 weight-%, preferably from 1.5 weight-% to 4.0 weight-%, and most preferably from 2.5 weight-% to 3.5 weight-%, based on the total weight of composition A. The amounts are specifically chosen to modify the adhesion properties of the resin to achieve a long-lasting sealing of the damaged articles.

In a preferred embodiment of the present invention the resin of diglycidyl ether of Bisphenol A which carries at least one electron-withdrawing substituent at the aromatic moiety is present in an amount ranging from 5 weight-% to 70 weight-%, preferably from 15 weight-% to 60 weight-%, and most preferably from 25 weight-% to 45 weight-%, based on the total weight of composition A. The amount of resin a) in composition A may be adapted according to the desired properties the cured mixture should possess. If the amount of resin a) is too high the curing of the mixture is too fast resulting in a very short working time in which the mixture can be applied. In consideration of the processes in which the mixture is employed which also include the transportation of the mixture to the desired side after the compositions have been mixed, at least 30 minutes should be allowed before the curing of the mixture prevents processability of the mixture. On the other hand the curing should not take too long as to avoid any additional latency. Therefore, the amount of the resin of diglycidyl ether of Bisphenol A which carries electron-withdrawing substituents on the aromatic moiety should be chosen to achieve a satisfactory balance between good adhesion and appropriate curing time.

In a preferred embodiment of the present invention composition A further comprises a Bisphenol A epoxy resin preferably having a number average molecular weight of less than 700 g/mol. Although any Bisphenol A epoxy resin is suitable the best performance was achieved in cases where mixtures of Bisphenol A epoxy resin and Bisphenol F epoxy resin are used. Therefore, the most preferred epoxy resin is a Bisphenol A/F epoxy resin.

Preferably the Bisphenol A epoxy resin preferably having a number average molecular weight of less than 700 g/mol is present in the composition A in an amount ranging from 10 weight-% to 80 weight-%, preferably from 20 weight-% to 70 weight-%, and most preferably from 40 weight-% to 60 weight-%, based on the total weight of composition A.

The epoxy compounds play an important role in the rehabilitation of glazed surfaces as it mainly influences the adhesion properties of the mixture and thus determines whether a certain mixture would be suitable or not. In order optimize the properties of a mixture in accordance to adhesion and curing time, a mixture of more than one epoxy compounds can be used.

Thus, according to a preferred embodiment of the present invention composition A comprises at least three epoxy compounds wherein the monomers differ structurally and chemically from each other. Preferably the epoxy compounds are present in the form of a resin.

The properties of the system according to the invention such as adhesion and curing time as well as viscosity can be modified by the addition of different epoxy compounds. Consequently, the epoxy compounds should be carefully chosen regarding their properties and compatibility to achieve the best performance possible for each individual rehabilitation process.

During the process of rehabilitation of glazed surfaces the system that is used for repairing the damage, for example by serving as a glue to affix a glass fiber fabric which is impregnated with a mixture of composition A and B to the damaged site, has to be mixed or applied to the fabric. It thus has to have a certain viscosity that allows a safe and easy handling of the system.

According to a preferred embodiment of the present invention composition A further comprises diluents to ensure a thorough impregnation of the fabric by the otherwise rather viscous composition and consequently a strong adhesion to the respective surface. In a preferred embodiment a reactive diluent, preferably having one or more epoxy groups can be used to lower the viscosity of the composition. An especially preferred diluent is neopentyl glycol diglycidyl ether. Preferably the diluent is present in an amount ranging from 10 weight-% to 30 weight-%, based on the total amount of resin a) and diluent.

Apart from the viscosity an additional crucial property of the system is its curing temperature, meaning the temperature at which the curing of the resin takes place. Since the system according to the invention is preferably intended for the use in rehabilitation of glazed surfaces and mostly preferred for the rehabilitation of underground pipes, it is desirable for the resin to possess a short curing cycle at rather lower temperatures, even below room temperature, e.g. below 20° C. or below 15° C.

Therefore, in a preferred embodiment the composition A may further comprise additives intended to adjust the glass transition temperature of the cured composition derived from curing a mixture of compositions A and B. These additives can for example be polymeric structures of epichlorohydringlycol and/or propylenglycoldiglycidylether.

Therefore, in a preferred embodiment of the present invention composition A further comprises a polymeric epichlorohydrin polyglycol. Preferably the polymeric epichlorohydrin polyglycol is present in composition A in an amount ranging from 1.0 weight-% to 12 weight-%, preferably from 3 weight-% to 10 weight-%, and most preferably from 5 weight-% to 7 weight-%, based on the total weight of composition A.

Preferably composition A further comprises polypropylene glycol diglycidyl ether. The amount of polypropylene glycol diglycidyl ether in composition A preferably ranges from 1.0 weight-% to 20 weight-%, preferably from 5 weight-% to 15 weight-%, and most preferably from 11 weight-% to 13 weight-%, based on the total amount of composition A.

Phenalkamines are curing agents for epoxy resin. They are Mannich base compounds that are the reaction products of an aldehyde, such as formaldehyde, an amine and a phenolic compound. The phenolic compound is a cardanol-containing extract derived from Cashew Nutt Shell Liquid (CNSL). Amines used to form phenalkamine include for example ethylenediamine and diethyltriamine.

In a preferred embodiment the amount of phenalkamine present in composition B ranges from 10 weight-% to 70 weight-%, preferably from 20 weight-% to 60 weight-%, most preferably from 30 weight-% to 55 weight-%, based on the total weight of composition B.

In a preferred embodiment of the present invention composition B comprises a phenalkamine which contains 2 weight-% to 20 weight-%, preferably 5 weight-% to 10 weight-% of an ethylenamine, preferably triethylentetramine.

In a preferred embodiment of the present invention composition B additionally comprises co-curing agents. Additives known for their ability to enhance the curing properties of a given system, i.e. co-curing agents, are e.g. polymercaptanes, especially mixture of polymercaptanes and aminophenols such as 2,4,6-tris(diethylaminomethyl)phenol and/or 2,4,6-tris(dimethylamnimethyl)phenol.

Therefore, an embodiment of the present invention is preferred wherein composition B further comprises one or more co-curing agents based on a mixture of one or more polymercaptanes and one or more aminophenols. Especially preferred is a mixture of one or more polymercaptanes and 2,4,6-tris(diethylaminomethyl)phenol wherein preferably the amount 2,4,6-tris(diethylaminomethyl)phenol ranges from 2 to 15 weight-%, preferably 5 to 10 weight-%. According to a further preferred embodiment the aminophenol is 2,4,6-tris(dimethylaminomethyl)phenol which is preferably present in an amount of less than 10 weight-%, preferably less than 5 weight-%, especially between 0.1 and 5 weight-%. The weight-% are in these cases based on the total weight of the polymercaptane mixture.

In a preferred embodiment the composition B further comprises a mixture of tris(dimethylaminomethyl)phenol and bis(dimethlyaminomethyl)phenol. Preferably the mixture of tris(dimethylaminomethyl)phenol and bis(dimethlyaminomethyl)phenol contains no more than 90% of tris(dimethylaminomethyl)phenol and no more than 15% bis(dimethylaminomethyl)phenol. Also preferably the mixture of tris(dimethylaminomethyl)phenol and bis(dimethlyaminomethyl)phenol serves as catalyst and helps to accelerate the curing of the epoxy resin. Accordingly an embodiment of the invention is preferred wherein the amount of tris(dimethylaminomethyl)phenol and bis(dimethlyaminomethyl)phenol in composition B ranges from 1 weight-% to 30 weight-%, preferably from 3 weight-% to 20 weight-%, and most preferably from 5 weight-% to 10 weight-%, based on the total weight of the composition B.

Preferably the polymercaptans used in composition B of the present invention are derived from polyoxyalkylene glycols, for example by reacting the corresponding polyoxyalkylene glycol with thionyl chloride to give the corresponding dichloro derivative, followed by reaction of the dichloro compound with thiourea and hydrolysis of the product to give the desired dithiol.

In a preferred embodiment one or more polymercaptanes are present in composition B in an amount ranging from 10 to 60 weight-%, preferably 30 to 55 weight-%, based on the total weight of composition B.

In a preferred embodiment of the present invention composition B comprises a mercaptan which has the following formula (I):

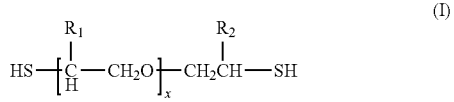

in which $R_1$ and $R_2$ are independently of one another hydrogen or methyl and x is an integer from 2 to 50, preferably 2 to 40 or 4 to 20.

Especially preferred is an embodiment of the present invention in which $R_1$ and $R_2$ are hydrogen and x is 2. This dithiol is also known as 1,8-dimercapto-3,6-dioxaoctane.

Preferably the mercaptan of formula (I) is present in composition B in an amount ranging from 1 weight-% to 60 weight-%, preferably from 3 weight-% to 50 weight-%, and most preferably from 8 weight-% to 30 weight-%, based on the total weight of composition B. In a preferred embodiment of the invention the mercaptan of formula (I) serves as a flexible co-curing agent, the addition of which also results in a lower glass transition temperature and a lower viscosity of the system thus rendering it more suitable for the intended purposes.

It has surprisingly been found that it is advantageous to use a mercaptane of formula (I) in combination with a further polymercaptane. That way the mechanical properties of the resin could be improved. Preferably the polymercaptane has a higher average molecular weight than the mercaptane of formula (I). The best results could be achieved in cases where the polymercaptane had a higher active hydrogen equivalent than the mercaptane of formula (I). Preferably the active hydrogen equivalent of the polymercaptane ranges from 120 to 220 g/eq, preferably from 180 to 210 g/eq. In a preferred embodiment the polymercaptane may also contain 5 to 10 weight-% of an aminophenol, especially 2,4,6-tris(dimethylaminomethyl)phenol.

The mercaptane of formula (I) preferably has an active hydrogen equivalent ranging from 65 to 115 g/eq, especially from 80 to 110 g/eq. In a further aspect of the invention the weight ratio of the mercaptane of formula (I) to a further polymercaptane ranges from 1:10 to 10:1, more preferably from 1:5 to 5:1, especially from 2:3 to 3:2.

Primary amines, especially those with a low active hydrogen equivalent, can be used to adjust the viscosity of a given system. They can also serve as curing agents, especially of epoxy compounds.

Therefore, in a preferred embodiment of the present invention composition B further comprises a primary amine with a low active hydrogen equivalent. Preferably the amine is triethylenetetramine and/or diethyltriamine.

Preferably the primary amine is present in composition B in an amount that ranges from 0.1 weight-% to 7.0 weight-%, preferably from 2.0 weight-% to 6.0 weight-%, and most preferably from 3.0 weight-% to 5.0 weight-%, based on the total weight of composition B. The amounts are chosen to achieve a pot life of the composition suitable for the rehabilitation process.

Sulphur-containing compounds such as thiols are known to the person skilled in the art to possess very negative olfactomeric properties, meaning they have a very unpleasant carrion-like odor. Although these unpleasant odors do not necessarily mean that these compounds are harmful in some cases it is convenient to mask these vapors, especially if the thiol-containing mixture needs to be handled in the open.

Therefore, in a preferred embodiment of the present invention composition B further comprises an odor masking agent such as pine oil. Preferably the odor masking agent is present in an amount ranging from 0.01 weight-% to 2.0 weight-%, preferably from 0.1 weight-% to 0.5 weight-%, based on the total weight of composition B.

As mentioned earlier the curing time of a system is important for its application in the rehabilitation of glazed surfaces. The faster the resin is cured the faster the damaged object, usually underground pipes, can be used again for the transport of gas, water, sewage and the like.

The supply with gas and fresh water as well as the proper disposal of sewage is an essential part of our civilization. Especially the disposal of waste water plays an important role as not only cosmetic but also health and safety issues have to be considered. In most cases the supply and drainage, respectively, are based on a system of underground pipes. Since the pipes are buried under ground the renovation of leaks and damages in the pipes presents a major problem due to their difficult accessibility. The excavation and replacement of the damaged section would be a very cost- and labor-intensive undertaking, not to mention the enormous strain put on the environment.

Therefore, it is an object of the present invention to provide a process which allows a fast and effective rehabilitation of underground pipes.

Accordingly a further embodiment of the present invention is a process for the trenchless rehabilitation of pipes, preferably sewage pipes, involving the following steps:
  preparing a reactive mixture by mixing compositions A and B of the system according to the invention,
  impregnating a fabric material with the reactive mixture,
  placing the impregnated fabric material around an inflatable tube which in turn is inserted into the pipe,
  contacting the inner surface of the pipe with the impregnated fabric material by inflating the inflatable tube; and
  deflating the inflatable tube and removing the inflatable tube after the reactive mixture of the compositions A and B according to a system of the present invention is at least partly cured and the fabric material is attached to the inner surface of the pipe.

In preparation for the trenchless renovation of pipes the compositions used for the resin, which so far have been kept separately, have to be mixed to obtain a reactive mixture which is then used in the renovation process to "glue" a fabric material to the inner wall of the pipe and thus covering and sealing the damage. In most cases the resin is delivered in 5-10 l containers and the measuring of the correct mixing ratio as well as manual mixing may take place on site. This can lead to higher mishandling risks, higher waste of the resin and longer exposure times of the workers to the uncured product. Therefore, a resin composition that can be delivered as a kit would be desirable.

Consequently a further object of the present invention is a cartridge comprising the following compartments
  a) a first compartment which contains composition A of a system according to the present invention,
  b) a second compartment which is separate from the first and which contains composition B of a system according to the present invention; and c) optionally a static mixer which is connected to the two compartments and through which the reactive mixture can be discharged.

In a preferred embodiment a mixer can be attached to the cartridge before using the cartridge. Preferably the mixer is detachable.

The cartridge of the invention allows a safe and risk-free handling of the compositions as well as of the reactive mixture, rendering a measuring and manual mixing on site unnecessary and thus reducing the strain on the workers and saving time in the overall process.

In a second step of the trenchless renovation of underground pipes a fabric material is impregnated with the reactive mixture. The impregnation involves a lamination step after the application of the reactive mixture to the fabric material. The application may be carried out by spraying, rolling or painting or other suitable methods. Preferably the reactive mixture is applied to the fabric material via spraying and then manually laminated.

In a preferred embodiment the manual lamination includes the application of the reactive mixture to the fabric material by spreading the reactive mixture on the fabric material with the help of a spatula. The reactive mixture is then evenly distributed with the help of a spatula to achieve a homogenous distribution of the reactive mixture. The impregnated material is then folded into several layers. Preferably the fabric material is folded in a way that results in three or more layers.

In a preferred embodiment of the process according to the invention the fabric material consists of glass fibers and/or synthetic fibers chosen from the group consisting of polyester-fibers, polyaramid-fibers, polyamide-fibers, polyurethane-fibers and polyolefin-fibers as well as mixtures thereof.

In an alternatively preferred embodiment of the present invention the reactive mixture is sprayed onto the fabric material to provide a homogenous cover in which the reactive mixture is evenly distributed. The impregnated fabric is then folded several times into several layers. Preferably, the fabric material is folded in a way that results in three or more layers.

The number of layers of the impregnated fabric material preferably corresponds to or exceeds the number of layers as required by the Deutsches Institut für Bautechnik for the corresponding processes.

Since the reactive mixture is preferably manually laminated which means that the workers are exposed to the reactive mixture, potential safety and health issues as well as risks to the environment have to be considered. In a preferred embodiment of the present invention the reactive mixture of the compositions A and B is therefore compliant with EHS (environment, health, safety). Most preferably the compositions A and B as well as the reactive mixture of composition A and composition B are not labeled harmful by inhalation according to EU regulation number 1907/2006: Registration, Evaluation, Authorization and Restriction of Chemicals (REACh).

In order to achieve an optimal performance of the resin a thorough impregnation of the fabric material is desirable. Therefore, in a preferred embodiment of the present invention the fabric material is suitable to absorb the reactive mixture.

The fabric material used in the trenchless renovation of pipes has to be flexible in order to properly mold to the inner wall of the pipe and at the time possess hardness and resistance against abrasion to ensure a stable and long-lasting mending of the damages. In a preferred embodiment of the present invention the fabric material consists of glass-fibers and/or synthetic fibers chosen from the group consisting of polyester-fibers, polyaramid-fibers, polyamide-fibers, polyurethane-fibers, and polyolefin-fibers as well as mixtures thereof.

In a third step of the trenchless renovation of underground pipes the impregnated fabric is placed around an inflatable tube which in turn is inserted into the pipe. The inflatable tube can for example be made out of rubber. Next the inflatable tube is inflated, usually by means of water, steam or air. The inflation causes the tube to expand, thus pressing the impregnated fabric material against the inner wall of the pipe.

For systems known in the prior art, usually the inner surface of the pipe has to be extensively cleaned and dried before the fabric material can be affixed. Some of these resins also require a roughening of the surface in order to achieve a better adhesion which is costly and requires additional working steps. However, in contrast and in a preferred embodiment of the present invention the inner surface of the pipe does not require a special treatment, a superficial cleaning being sufficient to achieve a strong adhesion of the fabric material according to the invention due to the improved properties of the system according to the present invention.

In a last step of the trenchless renovation of sewage pipes, the inflatable tube is deflated after the reactive mixture is cured and the fabric material is securely attached to the surface of the wall and the damaged section covered. The inflatable tube is removed while the impregnated fabric material remains inside the pipe and serves as the new surface of the wall.

Usually, in order to renovate an underground pipe, the damaged section is covered with a fabric material which is attached to the respective surface with the help of a resin which serves as glue. To achieve a long-lasting and satisfactory result it is desirable that the resin forms a secure connection between the fabric material and the surface. Thus the resin should not only possess good adhesion properties but also should be viscous enough to impregnate the fabric material. In the end it is the impregnated fabric material that makes up the repaired surface.

Consequently a further embodiment of the present invention is a fabric material which is impregnated with a reactive mixture of compositions A and B of a system according to the present invention.

The fabric material should on the one hand be resistant and hard enough to withstand pressure, temperature changes and other environmental impacts, for example abrasion. On the other hand the fabric material should be flexible enough that it can be molded to the surface of the wall and at least on layer should be suitable to sufficiently absorb the reactive mixture which is used as "glue". All those requirements are desirable to achieve a thorough and long-lasting renovation of the damaged pipe section. Therefore, in a preferred embodiment of the present invention the fabric material which is impregnated with a reactive mixture of compositions A and B of a system according to the present invention is selected from glass fibers and/or synthetic fibers selected from the group consisting of polyester-fibers, polyaramid-fibers, polyamide-fibers, polyurethane-fibers, and polyolefin-fibers as well as mixtures thereof.

The properties that are required of the fabric material used in the trenchless renovation of, for example, sewage pipes are manifold and not always easy to achieve. However, it is important for the fabric material to meet all those diverse requirements in order to achieve a satisfactory performance.

It has surprisingly been found that a multi-layer system renders better results and possesses enhanced properties desirable for the employment in the rehabilitation of glazed surfaces, such as improved adhesion properties. Additionally it would be possible to better fine tune the properties of composite materials by carefully choosing the kind of fabric as well as its interaction with the reactive mixture and the cured reactive mixture, respectively. Therefore, in a preferred embodiment of the present invention the fabric material consists of three or more layers. Preferably the layers consist of different materials. Each separate layer can also be individually folded to create a stack-like structure. The number of layers as well as the nature of those layers is preferably chosen according to the respective requirements of the respective site.

In an especially preferred embodiment the fabric comprises different kinds of fibers, preferably glass fibers and synthetic fibers. These fabrics made of different materials are usually referred to as hybride fabrics. In an especially preferred embodiment, the hybride fabric comprises glass fibers and synthetic fibers woven together. In an alternatively preferred embodiment the fabric comprises a glass fiber core with a spun synthetic outer sheath (coating), for example a coating of poly-aramid. It has surprisingly been found that those fabrics exhibit improved resistance to harsh chemicals and abrasive environment, as well as being easier to apply in the renovation process. Further, those fabrics are especially well adapted for use together with the system according to the invention. In a further embodiment the fabric comprises or essentially consists of glass fibers and poly-aramid, especially glass fibers coated with poly-aramid.

Especially preferred are mixed fabrics comprising at least 50 wt.-% of glass fibers, especially preferred 55 wt.-% of glass fibers, in particular 60 to 75 wt.-% of glass fibers, based on the total weight of the fabric. Further preferred are mixed fabrics with a weight ratio of glass fibers to synthetic fibers of 1:2 to 5:1, preferably 1.5:1 to 5:1, in particular 3:2 to 4:1.

In a preferred embodiment the process for trenchless rehabilitation of pipes comprises the following steps:
- preparing a reactive mixture (I) by mixing compositions A and B of the system according to the invention,
- preparing a reactive mixture (II) by mixing compositions A and B of the system according to the invention,
- impregnating a first fabric material with reactive mixture (I),
- impregnating a second fabric material with reactive mixture (II),
- placing the impregnated first fabric material around an inflatable tube and subsequently placing the impregnated second fabric material on top of the first fabric material around the inflatable tube,
- inserting said inflatable tube into the pipe,
- contacting the inner surface of the pipe with the impregnated second fabric material by inflating the inflatable tube, and
- deflating the inflatable tube and removing the inflatable tube after the reactive mixture (II) is at least partly cured and the second fabric material is attached to the inner surface of the pipe, wherein the cured reactive mixture (I) has a higher glass transition temperature ($T_g$) than the cured reactive mixture (II).

Preferably the glass transition temperature of the cured reactive mixture (I) ranges from 45 to 80° C., preferably from 50 to 70° C.

Preferably the glass transition temperature of the cured reactive mixture (II) ranges from 10 to 40° C., preferably from 15 to 35° C.

The glass transition temperature can be determined with the help of differential scanning calorimetry (DSC) measurements.

In an especially preferred embodiment the first fabric material comprises glass fibers. Preferably the second fabric material is different from the first fabric material, especially preferred is the second fabric material aramide.

In a preferred embodiment reactive mixture (I) is different from reactive mixture (II).

In a preferred embodiment of the present invention the rehabilitation of the pipe is carried out in a two layer method. Preferably, one layer consists of a first fabric material which is impregnated with a reactive mixture (I) of compositions A and B of a system according to the present invention, wherein the cured reactive mixture preferably has a glass transition temperature of about 50° C. to 70° C., and which is placed around the inflatable tube. A second fabric material, which is impregnated with a reactive mixture (II) of compositions A and B of a system according to the present invention, and wherein the cured reactive mixture preferably has a glass transition temperature of about 19° C. to 35° C., is placed on top of the first layer. Preferably the layers are arranged in such a way that the fabric material impregnated with the reactive mixture wherein the cured reactive mixture having the lower glass transition temperature is brought into direct contact with the inner surface of the pipe, thus becoming the inner layer.

In a preferred embodiment of the present invention the fabric material being impregnated with the reactive mixture (I) of compositions A and B of a system according to the present invention wherein the cured reactive mixture (I) has, preferably a glass transition temperature of about 50° C. to 70° C., is a densely packed fabric having a fiber area weight of 180 to 280 $g/m^2$, preferably 200 to 250 $g/m^2$ and especially preferred of 220 to 240 $g/m^2$. Further preferred is an embodiment wherein the fabric material which is impregnated with a reactive mixture (II) of compositions A and B of a system according to the present invention wherein the cured reactive mixture (II) has a glass transition temperature preferably ranging from 19° C. to 35° comprises glass fibers.

It has surprisingly been found that the system according to the present invention demonstrates excellent adhesion properties, especially on glazed surfaces as can be found on the inside of pipes or on tiles. Preferably, the pipes or tiles are made of materials such as ceramic, cement or concrete which have a glazed surface. It has further been found that the system according to the present invention shows a high resistance against abrasion, especially against abrasion that is caused by the presence of water, in particular flowing water.

Therefore, a further embodiment of the present invention is the use of a reactive mixture of composition A and composition B of a system according to the present invention or a fabric material according to the invention for the rehabilitation of pipes or for repairing tiles or for repairing devices having glazed surfaces. The reactive mixture of the system according to the present is especially suitable for repairing glazed surfaces that under use conditions are in permanent contact with water, most especially flowing water. These glazed surfaces can for example be employed in pipes or swimming pools. It has been found that the reactive mixture of the system according to the invention or the fabric according to the invention can be used to repair swimming pools, e.g. broken tiles at the walls and/or the floor of a swimming pool.

Furthermore the system according to the present invention or the fabric material according to the invention can for example be used for the sealing of pipes or tiles that are usually in permanent contact with water. Especially, connecting parts or areas of pipes can be sealed with the system according to the invention or the fabric according to the invention.

The invention is further illustrated by reference to the following no-limiting example.

EXAMPLE 1

Materials Used:

1,8-Dimercapto-3,6-dioxaoctane: available from Arkema AG, France.

Ancamine K54: Tris(dimethylaminomethyl)phenol/Bis (dimethylaminomethyl)-phenol, mixture<90%/<15%, available from Air Products and Chemicals Inc.

Araldite PY302-2: bisphenol F-epoxy resin/reaction product: Bisphenol A-(epichlorohydrin), obtained from Huntsman Advanced Materials; Switzerland.

Araldite 3601: polypropylene glycol diglycidylether, obtained from Huntsman Advanced Materials, Switzerland.

Aramine 39-730: formulated polymercaptan, supplied by Bitrez Ltd; United Kingdom.

Arapox 60-127: polymer of epichlorohydrinpolyglycol, available from Bitrez Ltd; United Kingdom.

BDP 2608: phenalkamine curing agent; mixture of phenalkamine with 5-10 wt % TETA; Bitrez Ltd; United Kingdom.

Dynasilan GLYMO: 3-glycidyloxypropyltrimethoxysilane, obtained from Evonik Industries, Germany.

Epalloy 7200 CB1: resin of a chemically modified liquid diglycidyl ether of Bisphenol A which carries electron-withdrawing groups at the aromatic moiety, containing 20 weight-% of neopentyl glycol diglycidyl ether, based on the total weight of the resin and neopentyl glycol diglycidyl ether, obtained from CVC Thermoset Specialties Division Emerald Performance Materials, USA.

Epikure 02511: Modified polymercaptan; polymercaptan in mixture with <5 wt % 2,4,6-tris(dimethylaminomethyl) phenol; available from Momentive Inc., USA:

Pine oil: available from Brenntag AG, Germany.

TETA: Triethylenetetramine, available from Huntsman Advanced Materials, Switzerland.

Composition A1:

TABLE 1

|  | Equiv. g/Eqw | Density g/cm$^3$ | Composition A1 [in weight-%] |
| --- | --- | --- | --- |
| Araldite PY302-2 | 173 | 1.18 | 45.00 |
| Dynasilan GLYMO | 236 | 0.95 | 3.00 |
| Araldite 3601 | 395 | 1.18 | 12.00 |
| Epalloy 7200 CB1 | 205 | 1.15 | 40.00 |
| Total weight |  |  | 100.00 |
| Equiv. g/eqv |  |  | 200.67 |
| Density |  |  | 1.16 |
| Equiv vol |  |  | 173.07 |

Composition B1:

TABLE 2

|  | AHW, g H Active/Equiv | Density g/cm$^3$ | Composition B1 [in weight-%] |
| --- | --- | --- | --- |
| BDP 2608 | 68 | 1.00 | 33.30 |
| Aramine 39-730 | 200 | 1.14 | 31.50 |
| TETA | 24.3 | 0.98 | 4.00 |
| Ancamine K54 |  | 0.98 | 7.00 |
| 1,8-Dimercapto-3,6-dioxaoctane | 91 | 1.14 | 24.00 |
| Pine oil |  | 0.915 | 0.20 |
| Total weight |  |  | 100.00 |
| Equiv, g/eqv |  |  | 92.98 |
| Density |  |  | 1.07 |
| Equiv vol |  |  | 86.86 |

Composition A2:

TABLE 3

|  | Equiv. g/Eqw | Density g/cm$^3$ | Composition A2 [in weight-%] |
| --- | --- | --- | --- |
| Araldite PY302-2 | 173 | 1.18 | 51.00 |
| Dynasilan GLYMO | 236 | 0.95 | 3.00 |
| Arapox 60-127 | 190 | 1.10 | 6.00 |
| Epalloy 7200 CB1 | 205 | 1.15 | 40.00 |
| Total weight |  |  | 100.00 |
| Equiv. g/eqv |  |  | 187.19 |
| Density |  |  | 1.15 |
| Equiv vol |  |  | 162.14 |

Composition B2:

TABLE 4

|  | AHW, g H Active/Equiv | Density g/cm$^3$ | Composition B1 [in weight-%] |
| --- | --- | --- | --- |
| BDP 2608 | 68 | 1.00 | 49.80 |
| Epikure 02511 | 185 | 1.14 | 30.00 |
| TETA | 24.3 | 0.98 | 4.00 |
| Ancamine K54 | — | 0.98 | 7.00 |
| 1,8-Dimercapto-3,6-dioxaoctane | 91 | 1.14 | 9.00 |
| Pine oil |  | 0.915 | 0.20 |
| Total weight |  |  | 100.00 |
| Equiv, g/eqv |  |  | 86.35 |
| Density |  |  | 1.05 |
| Equiv vol |  |  | 82.43 |

The glass transition temperatures were determined by differential scanning calorimetry (DSC).

Composition A1 and composition B1 were prepared according to the respective tables above. Compositions A1 and B1 were then mixed. The reactive mixture (1) showed a gel time of 50 minutes whereby the layer had a thickness of 74 μm. The tack free time, meaning the time after which the inflatable tube can be safely removed from the pipe, was measured to be 1 hour and 50 minutes. The onset of the glass transition of the cured mixture (1) was determined to take place at 19.6° C.

Composition A2 and composition B2 were prepared according to the respective tables above. The compositions A2 and B2 were mixed. The reactive mixture (2) showed a gel time of 45 minutes and a tack free time of 1 hour and 55 minutes. The glass transition temperature of the cured mixture (2) was 51.5° C.

TABLE 5

|  | Mixture (1) | Mixture (2) |
|---|---|---|
| Gel time | 50 min | 45 min |
| Tack free time | 1 h 50 min | 1 h 55 min |
| Rest enthalpy/1 day R, J/g | −23 | −36.8 |
| Tg, ° C.; onset/middle range | 19.6/33.86 | 51.5/63.8 |

Mixture (2) was spread onto a fabric made out of aramide and manually laminated. The impregnated aramide was placed around an inflatable tube. Mixture (1) was spread onto a glass fabric and manually laminated. The impregnated glass fabric was placed on top of the impregnated aramide around the inflatable tube. The inflatable tube was then placed inside a sewage pipe and inflated until the glass fabric was pressed against the inner wall of the pipe. The inflatable tube could be deflated and withdrawn from the pipe after 2 hours at 18° C. as the mixtures were cured, resulting in a tight system. The short curing time is rather surprising as usually epoxy based resins require at least 4 hours until the resin is cured and the inflatable tube can be removed.

A critical test for trenchless sewage renovation is the tightness of the repaired pipe after a defined period of time. The tightness of renovated pipes is tested by applying an additional external pressure of 0.5 bar directly to the adhesion line between the composite, meaning the newly affixed layers, and the pipe, usually by a water column. The adhesion test of the system according to the present invention to glazed ceramic pipes shows values of 3.5 N/mm². The adhesion of the described system to glazed surfaces was tested according to standard procedures known to the person skilled in the art.

No shrinkage of the resin was observed during the testing procedures.

The invention claimed is:

1. A system comprising a composition A and separately a composition B wherein
composition A comprises a resin of diglycidyl ether of Bisphenol A which carries at least one electron-withdrawing substituent at the aromatic moiety; and wherein
composition B comprises
a) a phenalkamine and
b) a mercaptan.

2. A system according to claim 1, wherein the resin diglycidyl ether of Bisphenol A which carries at least one electron-withdrawing substituent at the aromatic moiety is present in an amount ranging from 10 weight-% to 70 weight-%, preferably from 20 weight-% to 60 weight-%, and most preferably from 35 weight-% to 45 weight-%, based on the total weight of composition A.

3. A system according to claim 1, wherein the amount of phenalkamine in composition B ranges from 10 weight-% to 70 weight-%, preferably 20 weight-% to 60 weight-%, and most preferably 30 weight-% to 50 weight-%, based on the total weight of composition B.

4. A system according to claim 1, wherein the mercaptan of composition B has the following formula:

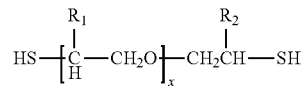

in which $R_1$ and $R_2$ are independently of one another hydrogen or methyl and x is an integer from 2 to 50.

5. A system according to claim 1, wherein the amount of mercaptan of formula (I) in composition B ranges from 1 weight-% to 60 weight-%, preferably from 3 weight-% to 50 weight-%, and most preferably from 8 weight-% to 30 weight-%, based on the total weight of composition B.

6. A process for the trenchless rehabilitation of pipes, preferably sewage pipes, involving the following steps:
preparing a reactive mixture by mixing the compositions A and B of a system according to claim 1,
impregnating a fabric material with the reactive mixture,
placing the impregnated fabric material around an inflatable tube which in turn is placed inside the pipe,
contacting the inner surface of the pipe with the impregnated fabric by inflating the inflatable tube,
deflating the inflatable tube and removing the inflatable tube after the reactive mixture of the compositions A and B is at least partly cured and the fabric material is attached to the inner surface of the pipe.

7. A process according to claim 6 wherein the fabric material consists of glass-fibers and/or synthetic fibers chosen from the group consisting of polyester-fibers, polyaramid-fibers, polyamide-fibers, polyurethane-fibers and polyolefin-fibers as well as mixtures thereof.

8. A cartridge comprising the following compartments
a) a first compartment which contains composition A of a system according to claim 1,
b) a second compartment which is separate from the first and which contains the composition B of a system according to claim 1; and
c) optionally a static mixer which is connected to the two compartments and through which the mixture is discharged.

9. A fabric material which is impregnated with a reactive mixture of compositions A and B of a system according to claim 1.

10. A fabric material according to claim 9 wherein the fabric is selected from glass fibers and/or synthetic fibers selected from the group consisting of polyester-fibers, polyaramid-fibers, polyamide-fibers, polyurethane-fibers and polyolefin-fibers as well as mixtures thereof.

11. A method of rehabilitating a pipe, repairing a tile, or repairing a device having a glazed surface, the method comprising applying the fabric of claim 9 to the pipe, tile, or device.

12. A method of rehabilitating a pipe, repairing a tile, or repairing a device having a glazed surface, the method comprising applying a reactive mixture of composition A and composition B of a system according to claim 1, to the pipe, tile, or device.

* * * * *